US010932104B2

(12) United States Patent
Karampatsis et al.

(10) Patent No.: US 10,932,104 B2
(45) Date of Patent: Feb. 23, 2021

(54) V2X COMMUNICATION OVER MULTIPLE RADIO ACCESS TYPES

(71) Applicant: Lenovo (Singapore) PTE. LTD., New Tech Park (SG)

(72) Inventors: Dimitrios Karampatsis, Ruislip (GB); Genadi Velev, Darmstadt (DE); Prateek Basu Mallick, Dreieich (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/379,447

(22) Filed: Apr. 9, 2019

(65) Prior Publication Data
US 2019/0394624 A1 Dec. 26, 2019

Related U.S. Application Data

(60) Provisional application No. 62/689,609, filed on Jun. 25, 2018.

(51) Int. Cl.
*H04W 4/40* (2018.01)
*H04W 88/06* (2009.01)
(Continued)

(52) U.S. Cl.
CPC ........... *H04W 4/40* (2018.02); *H04L 67/322* (2013.01); *H04W 88/06* (2013.01); *H04W 92/10* (2013.01); *H04W 92/18* (2013.01)

(58) Field of Classification Search
CPC ......... H04W 4/40; H04W 4/46; H04W 76/14; H04W 4/70; H04W 72/02; H04W 4/44;
(Continued)

(56) References Cited

U.S. PATENT DOCUMENTS

2008/0046963 A1* 2/2008 Grayson ............... H04L 67/322
726/1
2010/0112946 A1* 5/2010 Urushiyama ......... H04W 48/16
455/41.2
(Continued)

FOREIGN PATENT DOCUMENTS

WO 2016/206290 A1 12/2016
WO 2016/209197 A1 12/2016
(Continued)

OTHER PUBLICATIONS

3GPP Change Request C1-174643 by LG Electronics, dated Oct. 23-27, 2017 (Year: 2017).*
(Continued)

*Primary Examiner* — Daniel Lai
(74) *Attorney, Agent, or Firm* — Kunzler Bean & Adamson

(57) ABSTRACT

Apparatuses, methods, and systems are disclosed for V2X communication over multiple radio access types. One method includes supporting transmission of V2X messages over network connections for communication over multiple radio access types and network connections for direct V2X communication with other remote units over multiple radio access types. The method includes supporting V2X applications, wherein each V2X application uses the V2X messages transmitted via direct V2X communication over a radio access type and over a corresponding carrier frequency. The method includes supporting V2X applications, wherein each V2X application uses the V2X messages transmitted via the mobile communication network. The method includes receiving a request from a V2X application to transmit a message via the direct communication or via the mobile communication network. The method includes determining a transmission radio access type and a trans-
(Continued)

mission carrier frequency for transmitting the message over direct communication.

16 Claims, 11 Drawing Sheets

(51) Int. Cl.
*H04L 29/08* (2006.01)
*H04W 92/10* (2009.01)
*H04W 92/18* (2009.01)

(58) Field of Classification Search
CPC ............ H04W 24/10; H04W 72/0453; H04W 72/048; H04W 92/18; H04W 72/10; H04W 88/04; H04W 40/12; H04W 72/04; H04W 84/18; H04W 4/80; H04W 16/14; H04W 28/06; H04W 48/18; H04W 48/20; H04W 4/046; H04W 4/50; H04W 72/1215; H04W 76/15; H04W 76/23; H04W 88/02; H04W 24/02; H04W 28/02; H04W 4/04; H04W 72/1242; H04W 84/12; H04W 88/10; H04W 88/06; H04W 92/10; H04L 67/322

See application file for complete search history.

(56) References Cited

U.S. PATENT DOCUMENTS

| | | | |
|---|---|---|---|
| 2012/0026880 A1* | 2/2012 | Miller | H04W 4/90 370/235 |
| 2015/0092673 A1* | 4/2015 | Singh | H04W 4/029 370/329 |
| 2017/0150490 A1 | 5/2017 | Chen et al. | |
| 2017/0272384 A1 | 9/2017 | Lee et al. | |
| 2017/0295579 A1 | 10/2017 | Sheng | |
| 2018/0092065 A1* | 3/2018 | Sheng | H04W 74/006 |
| 2019/0052446 A1* | 2/2019 | Cheng | H04W 72/02 |
| 2019/0059071 A1 | 2/2019 | Khoryaev et al. | |
| 2019/0150082 A1* | 5/2019 | Kedalagudde | G08G 1/22 |
| 2019/0150176 A1* | 5/2019 | Pelletier | H04W 72/1247 370/329 |
| 2019/0159223 A1* | 5/2019 | Park | H04W 72/1252 |
| 2019/0230485 A1 | 7/2019 | Hahn | |
| 2019/0281491 A1 | 9/2019 | Cheng et al. | |
| 2019/0313222 A1 | 10/2019 | Karampatsis et al. | |
| 2019/0313305 A1 | 10/2019 | Karampatsis et al. | |
| 2019/0313359 A1* | 10/2019 | Lee | H04W 4/42 |
| 2019/0313469 A1 | 10/2019 | Karampatsis et al. | |

FOREIGN PATENT DOCUMENTS

| | | |
|---|---|---|
| WO | 2016209197 A1 | 12/2016 |
| WO | 2017/052683 A1 | 3/2017 |
| WO | 2017/147904 A1 | 9/2017 |
| WO | 2017/189035 A1 | 11/2017 |
| WO | 2018/022225 A1 | 2/2018 |
| WO | 2018022225 A1 | 2/2018 |

OTHER PUBLICATIONS

3GPP, "3rd Generation Partnership Project; Technical Specification Group Services and System Aspects; Architecture enhancements for V2X services (Release 15)", 3GPP TS 23.285 V15.0.0, Mar. 2018, pp. 1-36.

3GPP, "3rd Generation Partnership Project; Technical Specification Group Services and System Aspects; Enhancement of 3GPP support for V2X scenarios; Stage 1 (Release 15)", 3GPP TS 22.186 V15.2.0, Sep. 2017, pp. 1-16.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15)", 3GPP TS 36.300 V15.1.0, Mar. 2018, pp. 1-341.

3GPP, "3rd Generation Partnership Project; Technical Specification Group Core Network and Terminals; Non-Access-Stratum (NAS) functions related to Mobile Station (MS) in idle mode (Release 15)", 3GPP TS 23.122 V15.3.0 , Mar. 2018, pp. 1-58.

3GPP, "3rd Generation Partnership Project; Technical Specification Group Services and System Aspects; Procedures for the 5G System; Stage 2 (Release 15)", 3GPP TS 23.502 V15.1.0, Mar. 2018, pp. 1-285.

3GPP, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018, pp. 1-786.

3GPP, "3rd Generation Partnership Project; Technical Specification Group Services and System Aspects; Service requirements for V2X services; Stage 1 (Release 14)", 3GPP TS 22.185 V14.3.0, Mar. 2017, pp. 1-14.

3GPP, "3rd Generation Partnership Project; Technical Specification Group Services and System Aspects; Study on architecture enhancements for EPS and 5G System to support advanced V2X services (Release 16)", 3GPP TR 23.786 V0.4.0, Mar. 2018, pp. 1-23.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

3GPP, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.6.0, Mar. 2018, pp. 1-50.

3GPP, 3rd Generation Partnership Project; Technical Specification Group Core Network and Terminals; User Equipment (UE) to V2X control function' protocol aspects; Stage 3 (Release 14), 3GPP TS 23.386 V14.3.0, Dec. 2017, pp. 1-35.

PCT/IB2019/000390, "Notification of Transmittal of the International Search Report and the Written Opinion of the International Searching Authority, or the Declaration", PCT International Searching Authority, dated Aug. 1, 2019, pp. 1-16.

PCT/IB2019/000392, "Notification of Transmittal of the International Search Report and the Written Opinion of the International Searching Authority, or the Declaration", PCT International Searching Authority, dated Jul. 19, 2019, pp. 1-14.

PCT/IB2019/000347, "Notification of Transmittal of the International Search Report and the Written Opinion of the International Searching Authority, or the Declaration", PCT International Searching Authority, dated Jul. 19, 2019, pp. 1-14.

IPCT/IB2019/000410—PCT Rule 44.1, Notification of Transmittal of the International Search Report and the Written Opinion, International Searching Authority, dated Aug. 30, 2019, 15 pages.

U.S. Appl. No. 16/379,215, "Office Action Summary", USPTO, dated Apr. 9, 2020, pp. 1-35.

U.S. Appl. No. 16/379,270, "Office Action Summary", USPTO, dated Apr. 9, 2020, pp. 1-35.

U.S. Appl. No. 16/379,270, "Office Action Summary", USPTO, dated Aug. 18, 2020, pp. 1-27.

U.S. Appl. No. 16/379,270, "Office Action Summary", USPTO, dated Apr. 9, 2019, pp. 1-16.

\* cited by examiner

V2X COMMUNICATION OVER MULTIPLE RADIO ACCESS TYPES

CROSS-REFERENCE TO RELATED APPLICATIONS

This application claims priority to U.S. Patent Application Ser. No. 62/689,609 entitled "METHODS FOR PRIORITIZING TRANSMISSION OF V2X MESSAGES WHEN A UE SUPPORTS MULTIPLE V2X APPLICATIONS EACH APPLICATION HAVING DIFFERENT CARRIER FREQUENCY AND/OR RADIO ACCESS TECHNOLOGIES PREFERENCE REQUIREMENTS" and filed on Jun. 25, 2018 for Dimitrios Karampatsis, which is incorporated herein by reference in its entirety.

FIELD

The subject matter disclosed herein relates generally to wireless communications and more particularly relates to V2X communication over multiple radio access types.

BACKGROUND

The following abbreviations are herewith defined, at least some of which are referred to within the following description: Third Generation Partnership Project ("3GPP"), 4th Generation ("4G"), 5th Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSP"), Channel State Information-Reference Signal ("CSI-RS"), Common Search Space ("CSS"), Control Resource Set ("CORESET"), Device-to-Device ("D2D"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NS-SAI"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, V2X communication may be used. In such networks, devices may not be compatible with one another.

BRIEF SUMMARY

Methods for V2X communication over multiple radio access types are disclosed. Apparatuses and systems also perform the functions of the apparatus. One embodiment of a method includes supporting transmission of vehicle-to-everything messages over a first plurality of network connections for communication with a mobile communication network over a plurality radio access types and a second plurality of network connections for direct vehicle-to-everything communication with other remote units over a plurality of radio access types. In certain embodiments, the method includes supporting a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency. In various embodiments, the method includes supporting a second plurality of vehicle-to-everything applications, wherein each vehicle-to-everything application of the second plurality of vehicle-to-everything applications uses the vehicle-to-everything messages transmitted via the mobile communication network. In some embodiments, the method includes receiving a request from a vehicle-to-everything application of the first plurality of vehicle-to-everything applications or the second plurality of vehicle-to-everything applications to transmit a message via the direct vehicle-to-everything communication or via the mobile communication network. In certain embodiments, the method includes determining a transmission radio access type and a transmission carrier frequency for transmitting the message over direct vehicle-to-everything communication.

One apparatus for V2X communication over multiple radio access types includes a processor that: supports transmission of vehicle-to-everything messages over a first plurality of network connections for communication with a mobile communication network over a plurality radio access types and a second plurality of network connections for direct vehicle-to-everything communication with other remote units over a plurality of radio access types; supports a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency; and supports a second plurality of vehicle-to-everything applications, wherein each vehicle-to-everything application of the second plurality of vehicle-to-everything applications uses the vehicle-to-everything messages transmitted via the mobile communication network. In some embodiments, the apparatus includes a receiver that receives a request from a vehicle-to-everything application of the first plurality of vehicle-to-everything applications or the second plurality of vehicle-to-everything applications to transmit a message via the direct vehicle-to-everything communication or via the mobile communication network. In various embodiments, the processor determines a transmission radio access type and a transmission carrier frequency for transmitting the message over direct vehicle-to-everything communication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
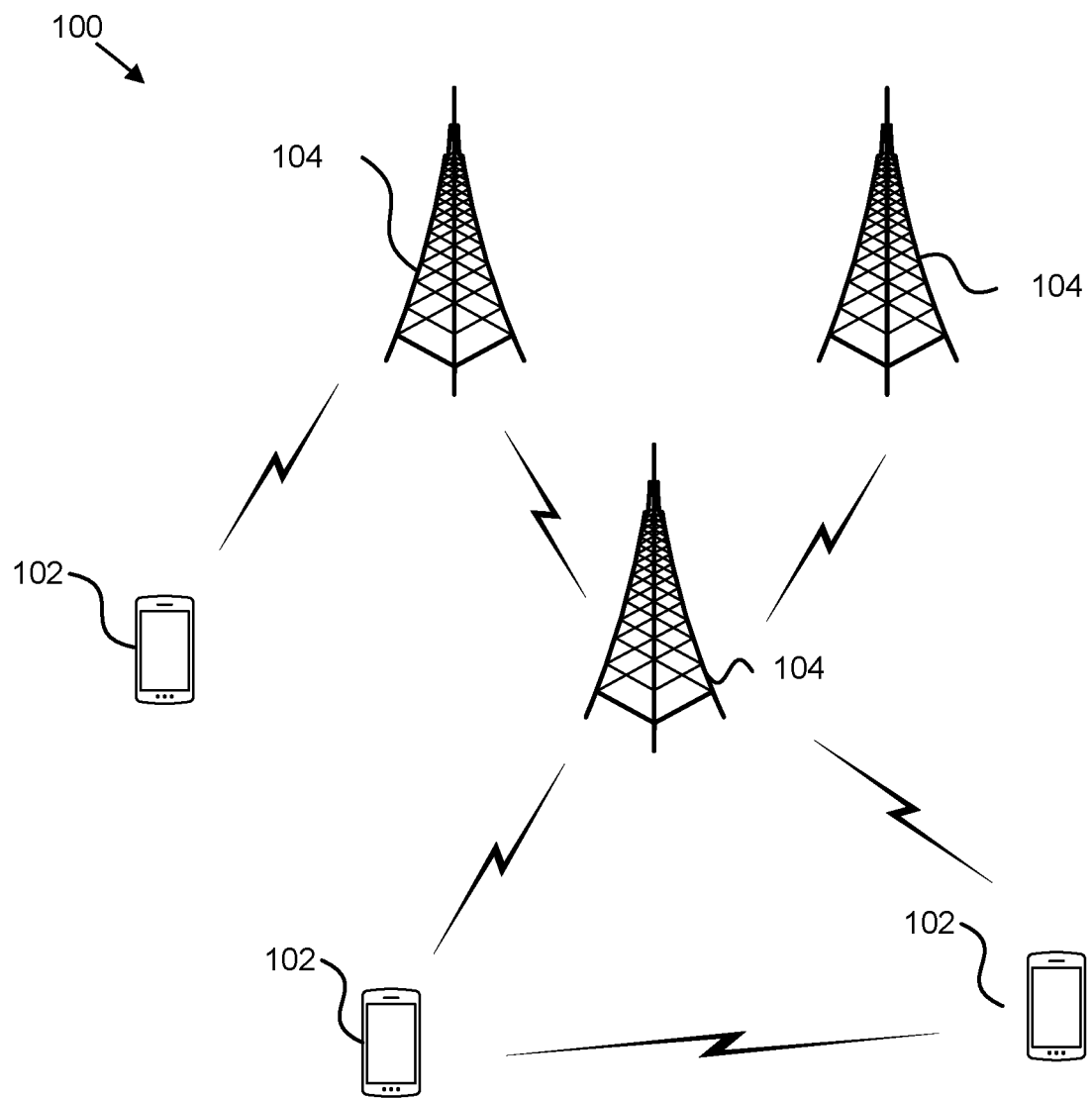
FIG. 1 is a schematic block diagram illustrating one embodiment of a wireless communication system for V2X communication over multiple radio access types.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for V2X communication over multiple radio access types. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may support transmission of vehicle-to-everything messages over a first plurality of network connections for communication with a mobile communication network over a plurality radio access types and a second plurality of network connections for direct vehicle-to-everything communication with other remote units over a plurality of radio access types. In certain embodiments, the remote unit 102 may support a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency. In various embodiments, the remote unit 102 may support a second plurality of vehicle-to-everything applications, wherein each vehicle-to-everything application of the second plurality of vehicle-to-everything applications uses the vehicle-to-everything messages transmitted via the mobile communication network. In some embodiments, the remote unit 102 may receive a request from a vehicle-to-everything application of the first plurality of vehicle-to-everything applications or the second plurality of vehicle-to-everything applications to transmit a message via the direct vehicle-to-everything communication or via the mobile communication network. In certain embodiments, the remote unit 102 may determine a transmission radio access type and a transmission carrier frequency for transmitting the message over direct vehicle-to-everything communication. Accordingly, the remote unit 102 may be used for V2X communication over multiple radio access types.

Figure 2:
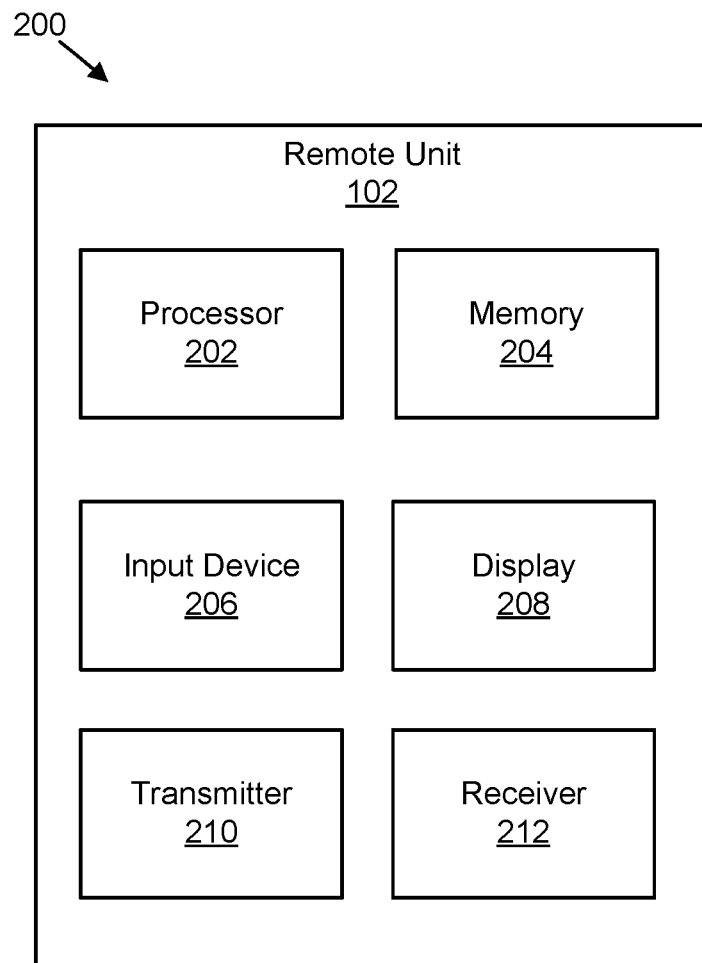
FIG. 2 is a schematic block diagram illustrating one embodiment of an apparatus that may be used for V2X communication over multiple radio access types.

FIG. 2 depicts one embodiment of an apparatus 200 that may be used for V2X communication over multiple radio access types. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: support transmission of vehicle-to-everything messages over a first plurality of network connections for communication with a mobile communication network over a plurality radio access types and a second plurality of network connections for direct vehicle-to-everything communication with other remote units over a plurality of radio access types; support a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency; support a second plurality of vehicle-to-everything applications, wherein each vehicle-to-everything application of the second plurality of vehicle-to-everything applications uses the vehicle-to-everything messages transmitted via the mobile communication network; and determine a transmission radio access type and a transmission carrier frequency for transmitting the message over direct vehicle-to-everything communication. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives a request from a vehicle-to-everything application of the first plurality of vehicle-to-everything applications or the second plurality of vehicle-to-everything applications to transmit a message via the direct vehicle-to-everything communication or via the mobile communication network.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
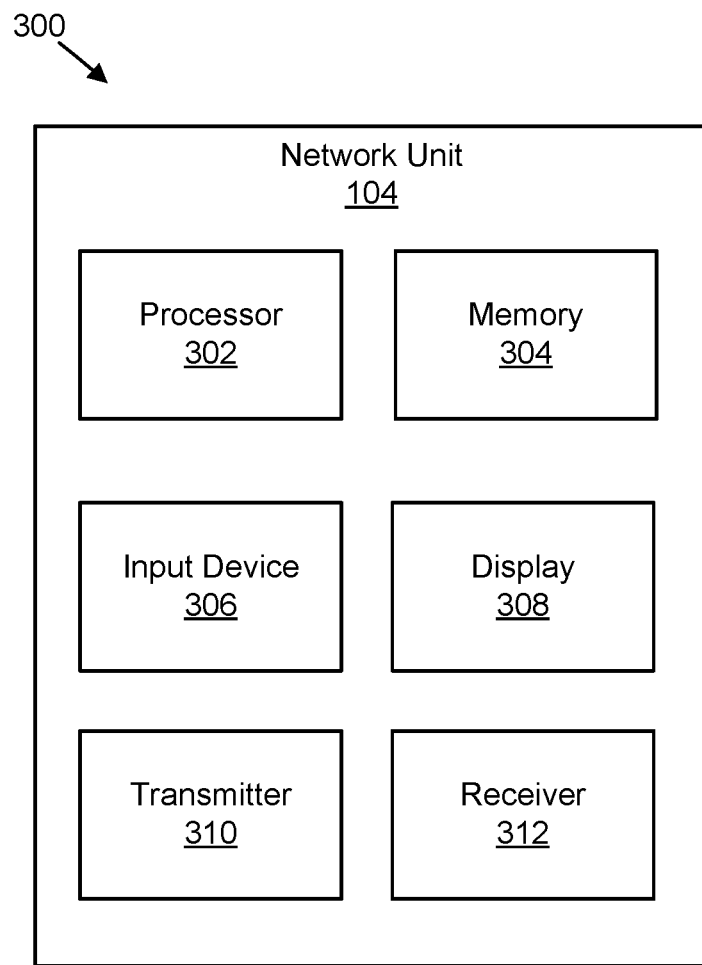
FIG. 3 is a schematic block diagram illustrating one embodiment of an apparatus that may be used for V2X communication over multiple radio access types.

FIG. 3 depicts one embodiment of an apparatus 300 that may be used for V2X communication over multiple radio access types. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
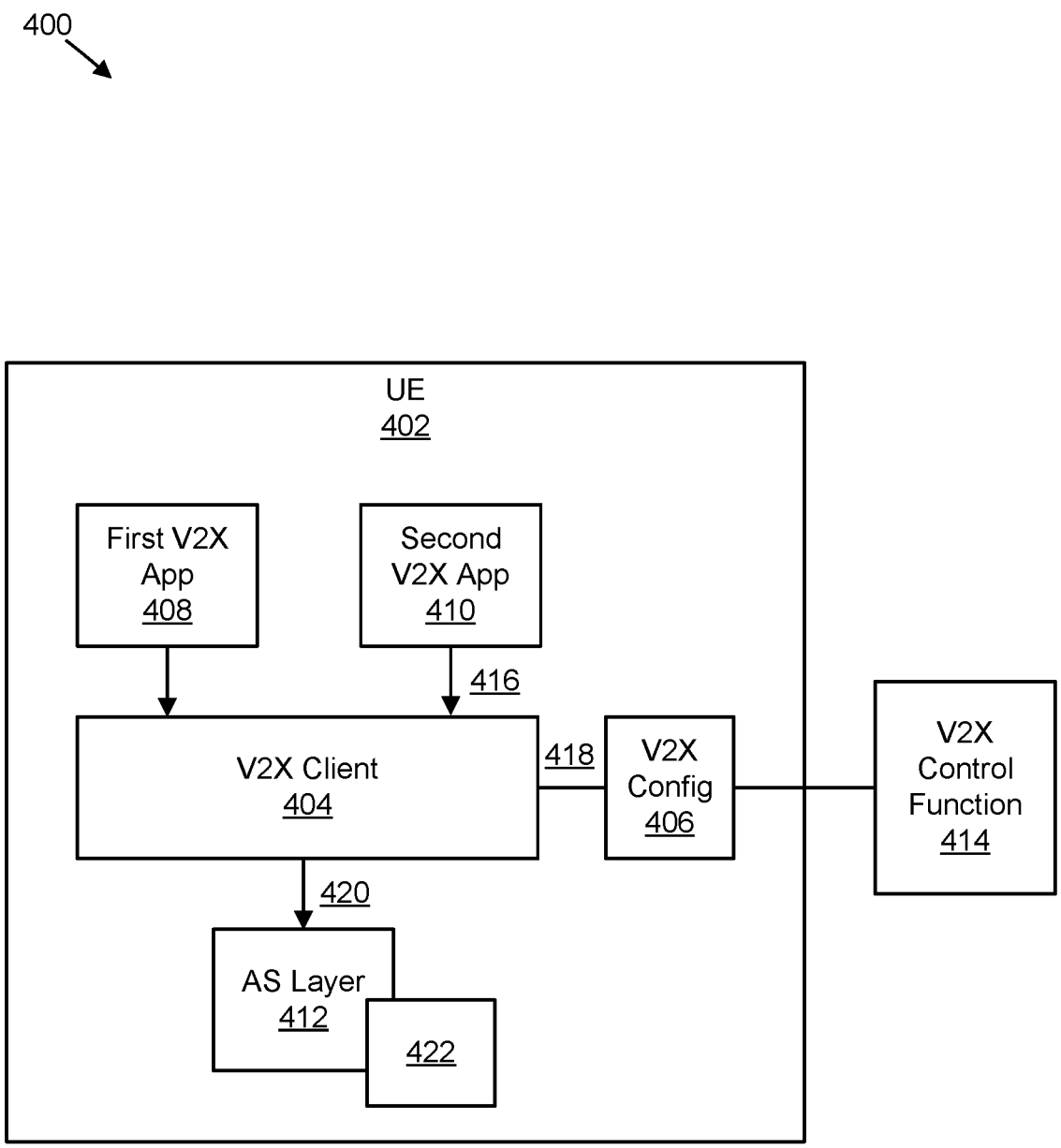
FIG. 4 is a schematic block diagram illustrating one embodiment of a system for sending a V2X message in a scheduled mode of operation.

FIG. 4 is a schematic block diagram illustrating one embodiment of a system 400 for sending a V2X message in a scheduled mode of operation. The system 400 includes a UE 402. The UE 402 may be substantially similar to the remote unit 102 as described herein. Moreover, the UE 402 includes a V2X client 404 and has a V2X configuration 406 (V2X config). The V2X configuration 406 may include an application ID to radio configuration, an application ID to TX profile mapping, and/or a TX profile (e.g., E-UTRA, enhanced E-UTRA, NR).

The UE 402 also includes a first V2X application 408 (first V2X app) and a second V2X application 410 (second V2X app). The UE 402 has an AS layer 412 in communication with the V2X client 404. As illustrated, the system 400 also includes a V2X control function 414.

In some embodiments, the second V2X application 410 sends a message 416 to the V2X client 404 (e.g., the V2X layer) including the application ID. In various embodiments, the V2X client 404 may check 418 the V2X configuration 406 for the application ID to identify the carrier frequency and TX profile required to transmit the message.

In certain embodiments, the V2X client 404 sends 420 the requirements for the operating carrier frequency and TX profile to the AS layer 412. In some embodiments, the AS layer 412 checks 422 whether the current cell supports the operating carrier frequency for D2D communication for the second V2X application 410. If the cell does not support the operating carrier frequency, the AS layer 412 performs a PLMN selection.

In various embodiments, if a new V2X application requests to send a message over PC5, the UE 402 may select a different cell not supporting carrier frequencies of other V2X applications that are required to send messages over PC5. In certain embodiments, some V2X applications may transition to out of coverage operation, but this may affect the performance because scheduled mode operation may facilitate better resource management. In some embodiments, if a new V2X application requests to send a message over PC5, the UE 402 may select a cell that supports E-UTRA communications only. In such embodiments, V2X applications that are required to send message over Uu may be affected because E-UTRA may not support some QoS profiles or may not support URLLC communications, for example.

In one example, the UE 402 is served by E-UTRAN running one V2X application over PC5 (e.g., the first V2X application 408) with radio resources provided by a serving cell. The UE 402 has also a V2X application (e.g., the second V2X application 410) sending V2X messages via Uu. A new V2X application (e.g., a third V2X application) requests to send a message over PC5. The UE 402 detects that the serving cell does not support the carrier frequency required by the third V2X application. This results in the UE 402 potentially selecting a new cell interrupting services of the first V2X application 408 and the second V2X application 410 because the AS layer 412 does not have the visibility to identify the RAT type of frequency required by each active V2X application so the AS layer 412 will act based on an indication from the V2X layer.

In various embodiments, if a new V2X application (e.g., an application that was inactive) requests to send a message over PC5, the UE 402 may select a cell supporting the carrier frequency of the V2X service but may only support E-UTRA over Uu. In such embodiments, there may be V2X applications that are required to send message over NR Uu. Accordingly, if a cell is selected that support E-UTRA over Uu, the cell may not support some QoS profiles required by the V2X application.

In certain embodiments, configuration information corresponding to V2X applications may indicate whether the V2X applications are required to transmit V2X messages via Uu. In some embodiments, the UE 402 may receive additional configuration information indicating a required RAT type if transmitting a V2X message over Uu. In such embodiments, the UE 402 may use this configuration to determine whether the UE 402 needs to be on a cell supporting LTE-Uu or NR-Uu if a V2X message needs to be sent via a mobile communication network. In various embodiments, if the RAT preference configuration is present and the V2X application requests to send a V2X message via Uu and if the UE 402 determines that the cell supports the preferred RAT, then the UE 402 may send the V2X message. In certain embodiments, if the UE 402 determines that the cell does not support the preferred RAT, then the UE 402 does not send the V2X message.

In some embodiments, if there are multiple V2X applications active, the UE 402 needs additional configurations to identify if a new cell needs to be selected and which V2X applications must be supported in that cell. To support such an approach, two additional parameters may be included in the V2X configuration (e.g., a preemption flag and a priority of the V2X application).

An example configuration is as follows for a V2X configuration for V2X applications over Uu: V2X application ID to V2X application server address (e.g., Uu and/or RAT preference (LTE-Uu and/or NR-Uu), preemption indicator, priority).

In various embodiments, the UE 402 may be configured with V2X applications over PC5 that operate only in scheduled mode operation if sending V2X messages over PC5. In certain embodiments, if there are multiple V2X application active, the UE 402 may need configuration information to determine which V2X application must be in the scheduled mode operation and its priority. In such embodiments, the V2X configuration may be as follows: V2X Application ID to Radio Frequency (e.g., operation mode (mode 4 and/or mode 3 supported—if an application supports mode 3 only, then the application will operate only if a cell supports the V2X application's carrier frequency, otherwise no V2X message may be transmitted), preemption indicator, priority).

In some embodiments, if a V2X application requests to send a V2X message (e.g., over Uu or over PC5) the UE 402 determines how to select a cell as follows: 1) The UE 402 first determines whether the current cell the UE 402 has selected (is camped on) supports the operating carrier frequency (e.g., if the message is sent over PC5) or the RAT preference (e.g., if the message is sent over Uu) of the new V2X application. The V2X client 404 checks with the lower layers to determine whether the new V2X application requirements (e.g., carrier frequency or RAT preference) are supported in the serving cell; 2) If the AS layer 412 reports that the current cell does not support the carrier frequency, the UE 402 (e.g., the V2X client 404) may request that the AS layer 412 find a cell supporting the carrier frequency or RAT preference of the new V2X application and also the carrier frequency (e.g., for V2X messages over PC5) and/or RAT preference (e.g., for V2X messages over Uu) of the other active V2X applications. The V2X client 404 checks with the lower layers to determine whether there is such a cell that supports all active application requirements; and 3) If the AS layer 412 reports that no such cell is found, the UE 402 (e.g., the V2X client 404) needs to determine which active V2X applications need to be supported (e.g., because the UE 402 may have to select a new cell that could support all active V2X applications). The UE 402 (e.g., the V2X client 404) checks the priority and the preemption configuration to determine the V2X applications that need to be supported by a cell. For example, the UE 402 may determine that a V2X application sending messages over Uu must be on a cell supporting NR or that a V2X application sending messages over PC5 must run on scheduled mode operation and must not be preempted. The UE 402 uses the priority configuration to select the highest priority application and decide which application cannot be supported by a cell (e.g., based on the preemption configuration). Once the UE 402 selects the V2X applications (e.g., based on the priority and preemption information), the UE 402 checks with the lower layers to determine whether there is a cell that supports the prioritized V2X applications. If there is such cell, the UE 402 selects the cell and transmits the V2X message accordingly. V2X application that are not supported in the new selected cell will operate as out of coverage.

For example, if the UE 402 receives a request from a third V2X application to send a V2X over PC5 and has an active application sending a V2X message over Uu and PC5, the UE 402 may be configured with the following: 1) The first V2X application 408: Priority: 1; RAT preference: NR-Uu; and Preempt: No. 2) The second V2X Application 410: Priority: 2; Carrier Frequency: Y; and Preempt: No. 3) The third V2X Application: Priority: 3; Carrier Frequency: X; and Preempt: Yes.

In such an example, the UE 402 may check whether the third V2X application can be supported in the current cell. If the third V2X application cannot be supported, the UE 402 (e.g., the V2X client 404) checks with the AS layer 412 to determine whether there is a cell that supports all V2X application requirements. If there is no such cell, the V2X client 404 determines that the third V2X application has the lowest priority and can be preempted. Therefore, the UE 402 will request that the AS layer 412 selects a cell supporting NR-Uu and Carrier Frequency: Y.

Figure 5:
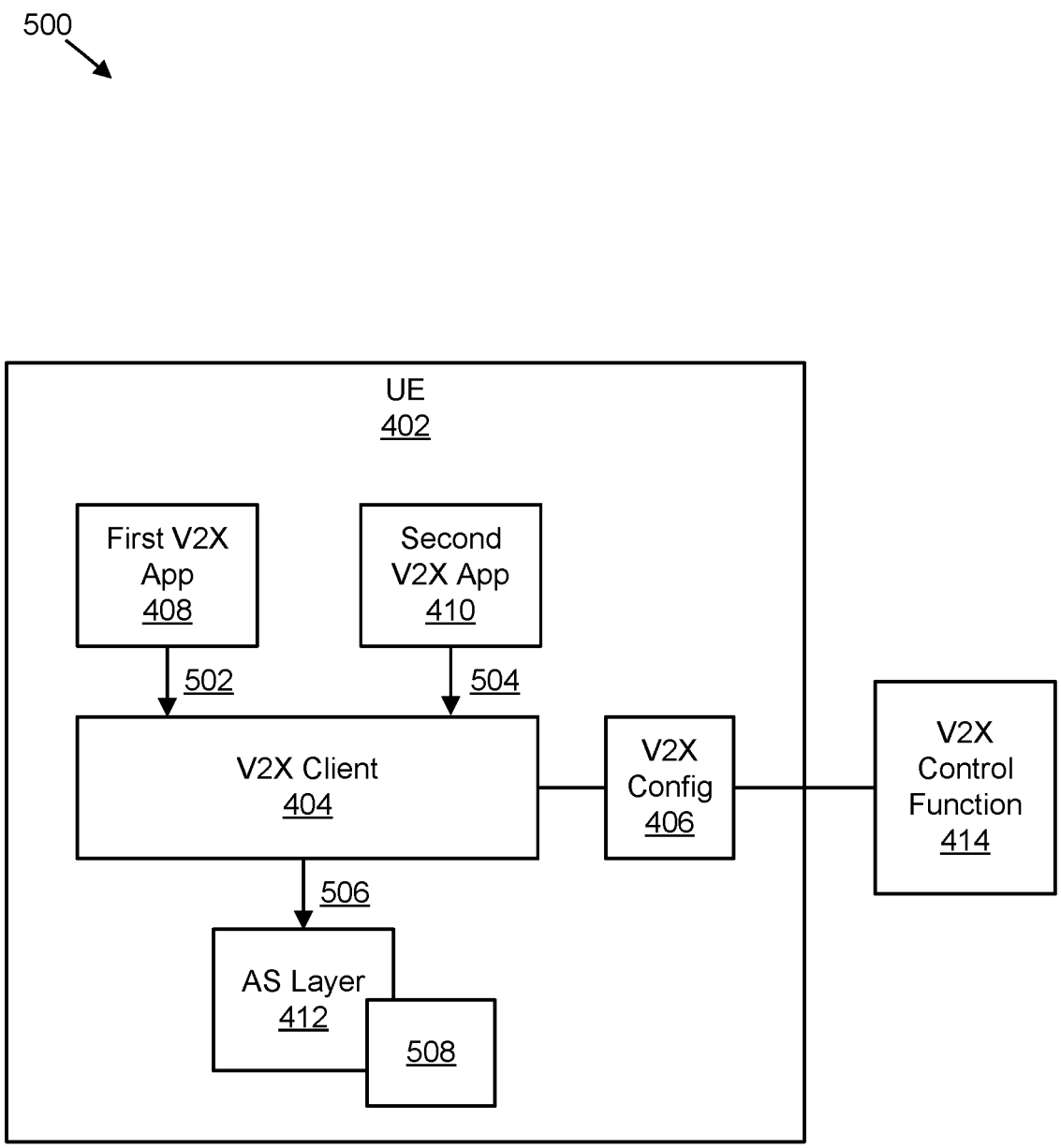
FIG. 5 is a schematic block diagram illustrating one embodiment of a system for a V2X client request to select a cell based on a V2X application priority and a preemption configuration.

FIG. 5 is a schematic block diagram illustrating one embodiment of a system 500 for a V2X client request to select a cell based on a V2X application priority and a preemption configuration. The system 500 includes the UE 402. The UE 402 may be substantially similar to the UE 402 of FIG. 4 and/or the remote unit 102 as described herein. Moreover, the UE 402 includes the V2X client 404 and has the V2X configuration 406 (V2X config). The V2X configuration 406 may include: a radio configuration per application ID; an application ID to TX profile mapping; a TX profile (e.g., E-UTRA, enhanced E-UTRA, NR); a mapping of an application ID to V2X AS, RAT preference, a priority, and/or a preemption; and/or a mapping of an application ID to carrier frequency, a priority, and/or a preemption.

The UE 402 also includes the first V2X application 408 (first V2X app) and the second V2X application 410 (second V2X app). The UE 402 has the AS layer 412 in communication with the V2X client 404. As illustrated, the system 500 also includes the V2X control function 414.

In certain embodiments, the first V2X application 408 is active and sends 502 V2X messages to the V2X client 404 via Uu. In some embodiments, the second V2X application 410 sends 504 a request to the V2X client 404 to transmit a message via PC5. In various embodiments, the V2X client 404 may check the V2X configuration 406 for the application ID to identify the carrier frequency and TX profile required to transmit the message. The V2X client 404 may determine that the second V2X application 410 cannot be supported by the current cell. Moreover, the V2X client 404 (e.g., V2X layer) may determine that there is a V2X application sending V2X messages over Uu, determine that NR over Uu is required, and that the V2X application must not be preempted. Accordingly, the V2X client 404 sends 506 the cell preferences to the AS layer 412 indicating that the new cell must support the carrier frequency of the second V2X application 410 and must also support NR-Uu.

In some embodiments, the AS layer 412 checks 508 whether the current cell supports the operating carrier frequency for the second V2X application 410 and NR-Uu. If the AS layer 412 does not find another cell, the UE 402 may send the V2X message over PC5 as out-of-coverage.

Figure 6:
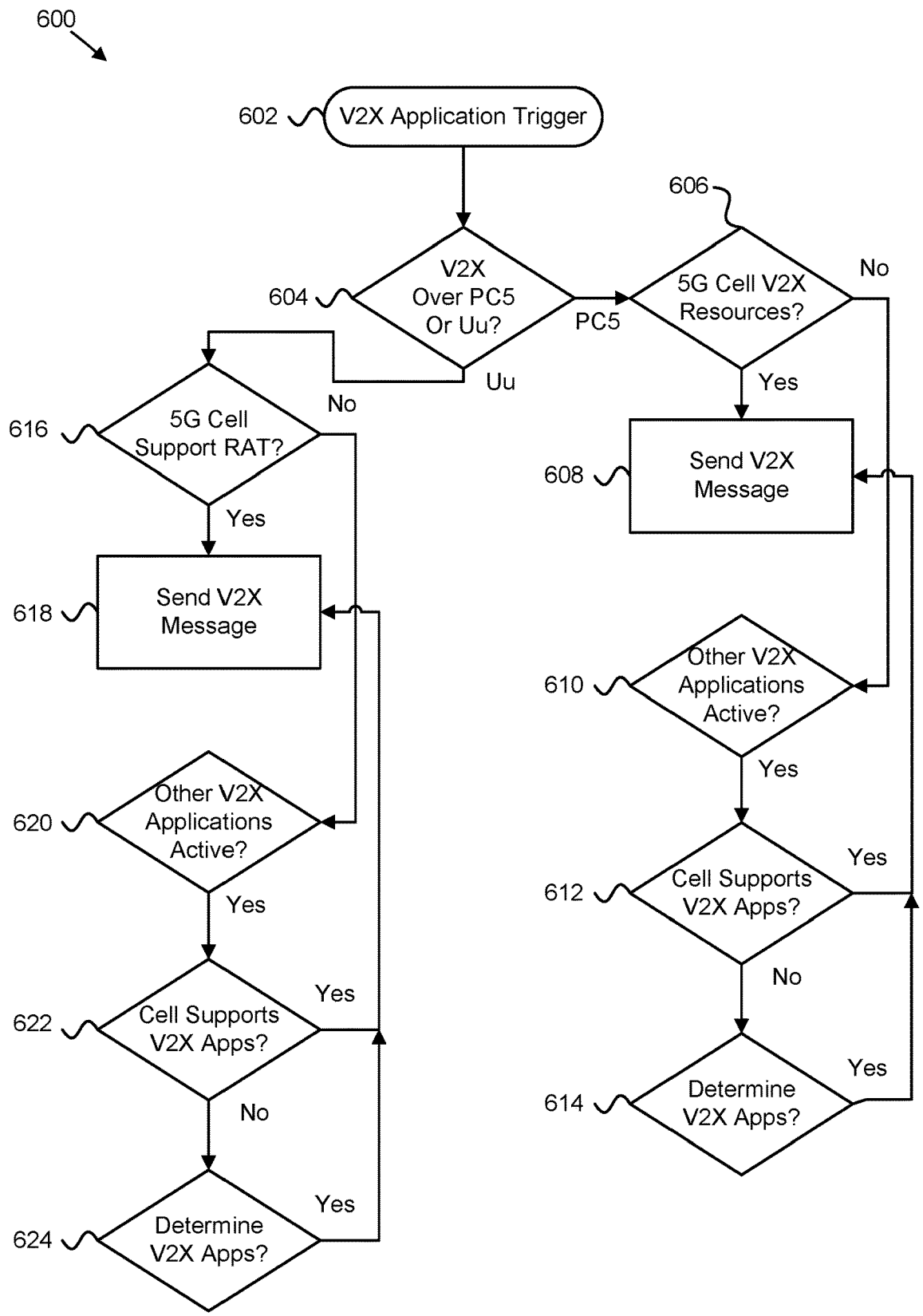
FIG. 6 is a flow chart diagram illustrating one embodiment of a method for selection of a cell to support multiple V2X applications.

FIG. 6 is a flow chart diagram illustrating one embodiment of a method for selection of a cell to support multiple V2X applications. The method 600 includes a V2X application being triggered 602. The method 600 determines 604 whether the V2X application is to use PC5 or Uu. If the V2X application is to use PC5, the method 600 may determine 606 whether the 5G cell provides resources for V2X communication. If the 5G cell provides resources for V2X communication, the method 600 may send 608 the V2X message, and the method 600 may end. If the 5G cell does not provide resources for V2X communication, the method 600 may determine 610 whether there are other V2X applications active.

If there are other V2X application active, the method 600 may determine 612 whether there is any cell that supports all active V2X applications. If there is a cell that supports all active V2X applications, the method 600 may send 608 the V2X message, and the method 600 may end. If there is no cell that supports all active V2X applications, the method 600 may determine 614 V2X applications that require a cell based on priority and preemption and may identify the corresponding cell. If a corresponding cell is identified, the method 600 may send 608 the V2X message, and the method 600 may end.

If the V2X application is to use Uu, the method 600 may determine 616 whether the 5G cell supports a RAT preference. If the 5G cell supports the RAT preference, the method 600 may send 618 the V2X message, and the method 600 may end. If the 5G cell does not support the RAT preference, the method 600 may determine 620 whether there are other V2X applications active.

If there are other V2X application active, the method 600 may determine 622 whether there is any cell that supports all active V2X applications. If there is a cell that supports all active V2X applications, the method 600 may send 618 the V2X message, and the method 600 may end. If there is no cell that supports all active V2X applications, the method 600 may determine 624 V2X applications that require a cell based on priority and preemption and may identify the corresponding cell. If a corresponding cell is identified, the method 600 may send 618 the V2X message, and the method 600 may end.

In various embodiments, the UE 402 (e.g., the V2X client 402) sends to lower layers (e.g., the AS layer 412) a list of prioritized cell selection procedures. For example, if the UE 402 determines that a new V2X application cannot be supported in the current cell, the V2X client 402 constructs a list of V2X applications in priority order according to their priority status and checks their V2X application requirements. The V2X client 402 then sends to the AS layer 412 a list of prioritized cell selection procedures. The AS layer 412 selects a cell according to the list in priority order.

In such embodiments, the V2X client 402 may evaluate the priority of each active V2X application and send a prioritized list of cell selection to the AS layer 412, such as the following cell selection: Priority 1: Support NR-Uu and Carrier Frequency: Y and Carrier Frequency: X; Priority 2: Support NR-Uu and Carrier Frequency: Y; and Priority 3: Support NR-Uu.

Moreover, in such embodiments, the AS layer 412 may go through the list of priority to select a cell. Based on the cell selected the UE 402 may configure the V2X application as in-coverage if supported by the new cell selected and out of coverage if not supported by the new cell.

In certain embodiments, if each cell support only one V2X application carrier frequency, the V2X client 404 may construct a list of V2X applications in priority order and send to the AS layer 412 a list of carrier frequencies in priority order. In such embodiments, the cell selection list may be as follows: Priority 1: Support NR-Uu an Carrier Frequency Y; and Priority 2: Support NR-Uu and Carrier Frequency X.

Figure 7:
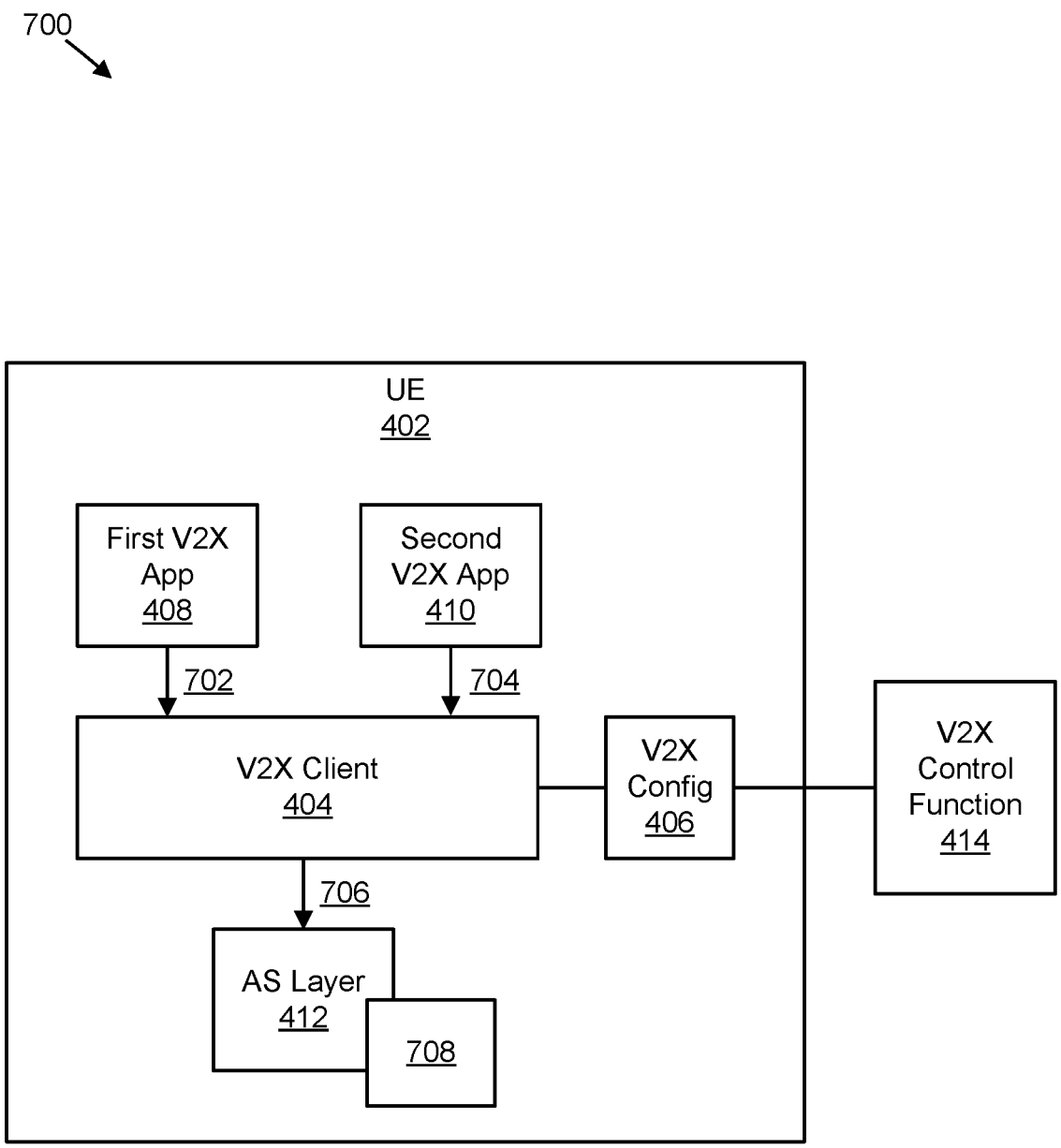
FIG. 7 is a schematic block diagram illustrating one embodiment of a system for a V2X client sending a list of cell selection preferences in priority order based on a V2X application priority.

FIG. 7 is a schematic block diagram illustrating one embodiment of a system 700 for a V2X client sending a list of cell selection preferences in priority order based on a V2X application priority. The system 700 includes the UE 402. The UE 402 may be substantially similar to the UE 402 of FIG. 4 and/or the remote unit 102 as described herein. Moreover, the UE 402 includes the V2X client 404 and has the V2X configuration 406 (V2X config). The V2X configuration 406 may include: a radio configuration per application ID; an application ID to TX profile mapping; a TX profile (e.g., E-UTRA, enhanced E-UTRA, NR); a mapping of an application ID to V2X AS, RAT preference, a priority, and/or a preemption; and/or a mapping of an application ID to carrier frequency, a priority, and/or a preemption.

The UE 402 also includes the first V2X application 408 (first V2X app) and the second V2X application 410 (second V2X app). The UE 402 has the AS layer 412 in communication with the V2X client 404. As illustrated, the system 700 also includes the V2X control function 414.

In certain embodiments, the first V2X application 408 is active and sends 702 V2X messages to the V2X client 404 via Uu. In some embodiments, the second V2X application 410 sends 704 a request to the V2X client 404 to transmit a message via PC5. In various embodiments, the V2X client 404 may check the V2X configuration 406 for the application ID to identify the carrier frequency and TX profile required to transmit the message. The V2X client 404 may determine that the second V2X application 410 cannot be supported by the current cell. Moreover, the V2X client 404 (e.g., V2X layer) may construct a list of cell selection in priority order according to a V2X application priority and preemption configuration. The V2X client 404 transmits 706 the list of cell selection in priority order to the AS layer 412.

In some embodiments, the AS layer 412 selects 708 a cell according to the priority order.

Figure 8:
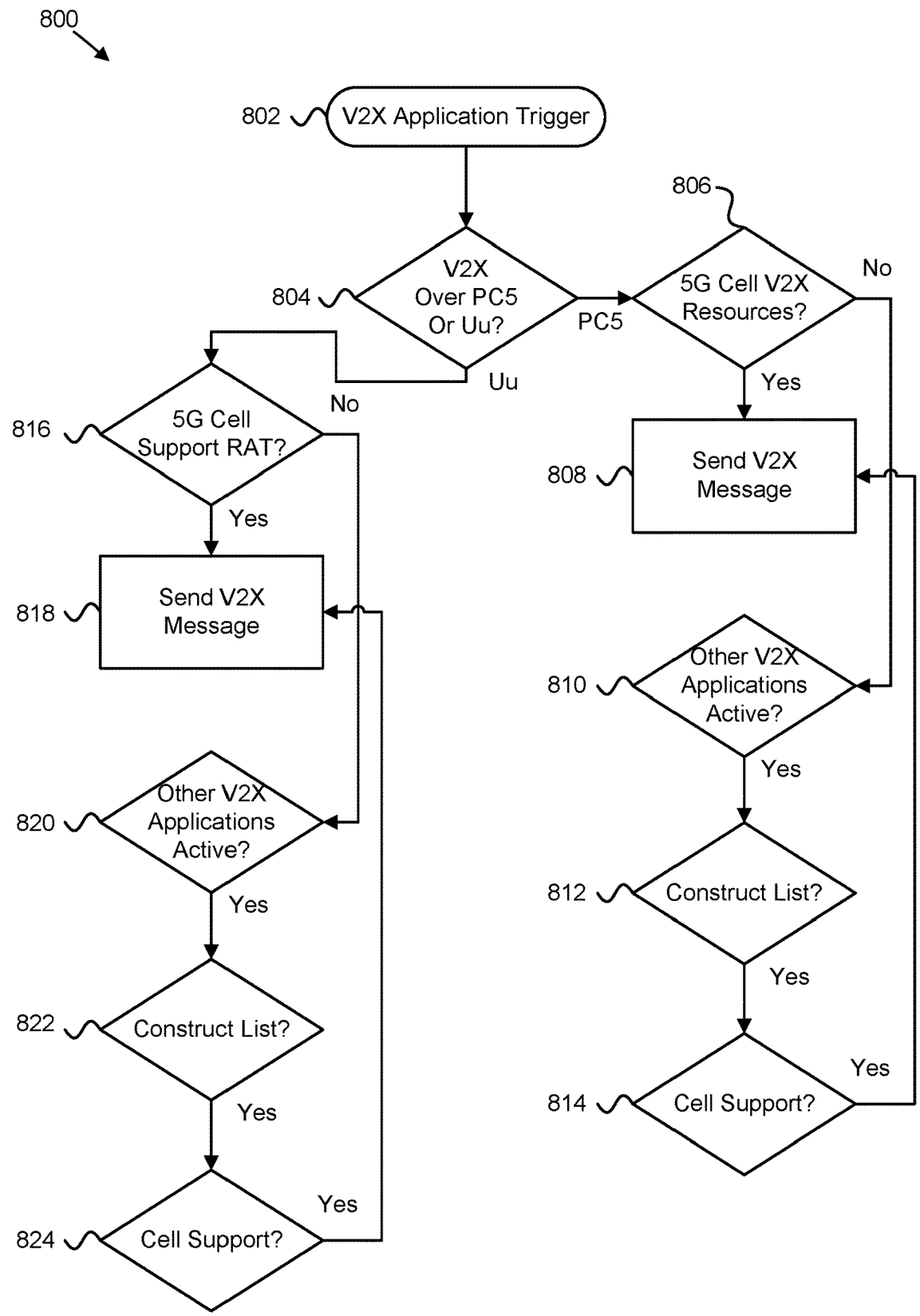
FIG. 8 is a flow chart diagram illustrating one embodiment of a method for selection of a cell based on a V2X client sending a list of cell selection preferences in priority order.

FIG. 8 is a flow chart diagram illustrating one embodiment of a method 800 for selection of a cell based on a V2X client sending a list of cell selection preferences in priority order. The method 800 includes a V2X application being triggered 802. The method 800 determines 804 whether the V2X application is to use PC5 or Uu. If the V2X application is to use PC5, the method 800 may determine 806 whether the 5G cell provides resources for V2X communication. If the 5G cell provides resources for V2X communication, the method 800 may send 808 the V2X message, and the method 800 may end. If the 5G cell does not provide resources for V2X communication, the method 800 may determine 810 whether there are other V2X applications active.

If there are other V2X application active, the method 800 may construct 812 a list of prioritized V2X applications based on the priority and preemption configuration, then sends the list of cell selection preferences in priority order. If the list is constructed, the method 800 may determine 814 if there is a cell supporting the cell selection preferences. If there is a supporting cell, the method 800 may send 808 the V2X message, and the method 800 may end.

If the V2X application is to use Uu, the method 800 may determine 816 whether the 5G cell supports a RAT preference. If the 5G cell supports the RAT preference, the method 800 may send 818 the V2X message, and the method 800 may end. If the 5G cell does not support the RAT preference, the method 800 may determine 820 whether there are other V2X applications active.

If there are other V2X application active, the method 800 may construct 822 a list of prioritized V2X applications based on the priority and preemption configuration, then sends the list of cell selection preferences in priority order. If the list is constructed, the method 800 may determine 824 if there is a cell supporting the cell selection preferences. If there is a supporting cell, the method 800 may send 818 the V2X message, and the method 800 may end.

In some embodiments, if a V2X application requests to send a V2X message (e.g., over Uu or over PC5) the V2X client 404 requests from the AS layer 412 what each cell in the vicinity of the UE 402 supports. The V2X client 404 may request to report what V2X carrier frequencies are supported by cells of the registered PLMN or via any PLMN.

In certain embodiments, the AS layer 412 may provide the following information to the V2X client: cell ID; V2X carrier frequency (or frequencies) supported; NR-Uu and/or E-UTRA Uu support. The V2X client may use such information to determine: whether a new cell needs to be selected; and/or if all active V2X applications can be supported.

In various embodiments, the V2X client 404 uses the V2X application priority and preemption configuration to determine which V2X applications can be supported. Once the V2X client 404 decides on the V2X application, the V2X client 404 sends a request to the AS layer 412 to select one of the cell reported by the AS layer 412 that can support the selected V2X applications.

Figure 9:
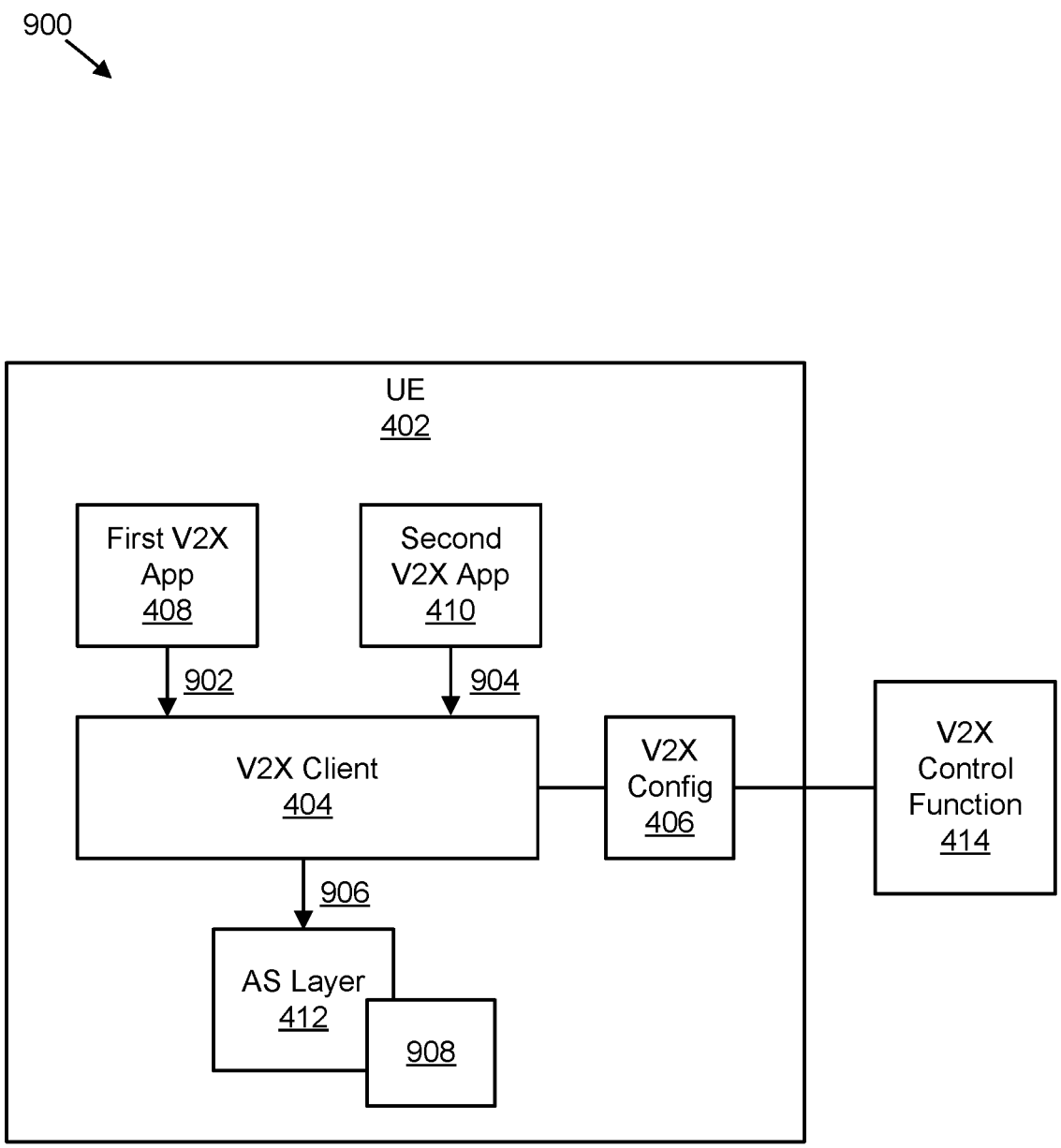
FIG. 9 is a schematic block diagram illustrating one embodiment of a system for an AS layer providing assistance information to a V2X client for cell selection.

FIG. 9 is a schematic block diagram illustrating one embodiment of a system 900 for an AS layer providing assistance information to a V2X client for cell selection. The system 900 includes the UE 402. The UE 402 may be substantially similar to the UE 402 of FIG. 4 and/or the remote unit 102 as described herein. Moreover, the UE 402 includes the V2X client 404 and has the V2X configuration 406 (V2X config). The V2X configuration 406 may include: a radio configuration per application ID; an application ID to TX profile mapping; a TX profile (e.g., E-UTRA, enhanced E-UTRA, NR); a mapping of an application ID to V2X AS, RAT preference, a priority, and/or a preemption; and/or a mapping of an application ID to carrier frequency, a priority, and/or a preemption.

The UE 402 also includes the first V2X application 408 (first V2X app) and the second V2X application 410 (second V2X app). The UE 402 has the AS layer 412 in communication with the V2X client 404. As illustrated, the system 900 also includes the V2X control function 414.

In certain embodiments, the first V2X application 408 is active and sends 902 V2X messages to the V2X client 404 via Uu. In some embodiments, the second V2X application 410 sends 904 a request to the V2X client 404 to transmit a message via PC5. In various embodiments, the V2X client 404 may check the V2X configuration 406 for the application ID to identify the carrier frequency and TX profile required to transmit the message. The V2X client 404 may determine that the second V2X application 410 cannot be supported by the current cell. Moreover, the V2X client 404 (e.g., V2X layer) may construct a prioritized list of active V2X applications and request from the AS layer 412 a list of cell IDs that support the V2X carrier frequencies and/or RAT preferences of active V2X applications. Based on the list of cell IDs provided by the AS layer 412, the V2X client 404 instructs 906 the AS layer 412 to select one of the cell IDs that supports active V2X applications.

In some embodiments, the AS layer 412 selects 908 a cell based on the V2X client 404 feedback.

In various embodiments, a decision to send a V2X message to the AS layer 412 for transmission may rely purely on the V2X application layer. In one embodiment, the V2X layer is configured by the V2X control function 414 with information that indicates the V2X application prioritization. Such prioritization may be used by the V2X layer to decide how to send V2X messages.

For example, if the UE 402 runs two V2X applications, the V2X control function may provide the following configuration: 1) the first V2X application 408: Priority 1; Preemption: No. 2) the second V2X application 410: Priority 2; Preemption: Yes.

In some embodiments, the V2X layer may use the configuration as follows: 1) If the second V2X application 410 is active and the first V2X application 408 requires to send a V2X message, the V2X layer first checks whether the second V2X application 410 can be supported by the serving cell. If the V2X application cannot be supported, the V2X client checks the V2X configuration and identifies that the first V2X application 408 is of higher priority and that the second V2X application 410 can be preempted. The V2X layer decides to request resources for the first V2X application 408. The second V2X application 410 will operate as out of coverage. 2) If the first V2X application 408 is active and the second V2X application 410 requires to send a V2X message, the V2X layer asks the lower layer if the second V2X application 410 can be supported. If the second V2X application 410 cannot be supported, the V2X client 404 checks the V2X configuration and determines that the second V2X application 410 is of lower priority. The V2X client 404 decides not to request cell resources for the second V2X application 410. In such a case, the second V2X application 410 will operate as out of coverage.

Figure 10:
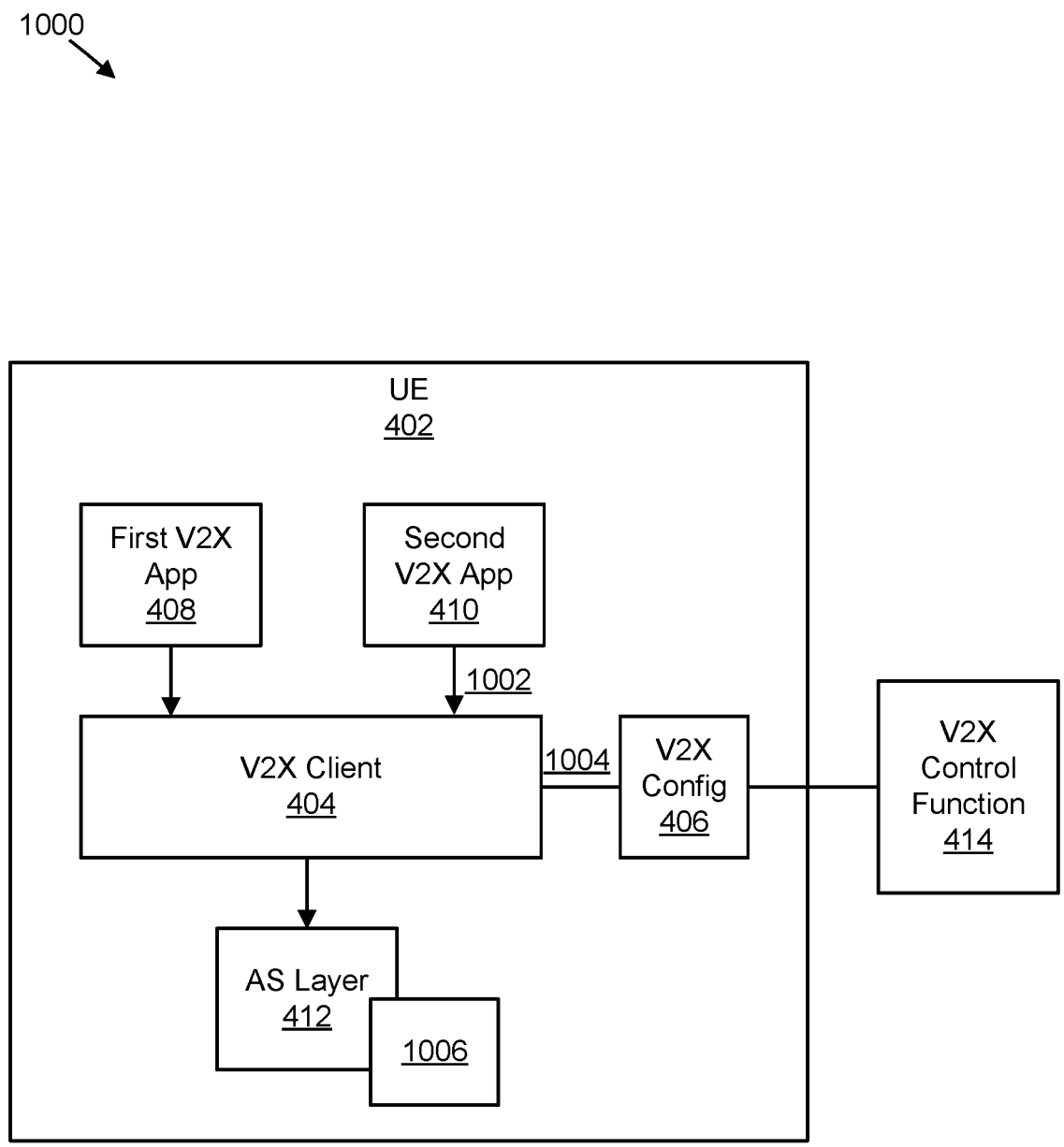
FIG. 10 is a schematic block diagram illustrating one embodiment of a system for transmitting a V2X message if multiple V2X applications are active without impacting an AS layer.

FIG. 10 is a schematic block diagram illustrating one embodiment of a system 1000 for transmitting a V2X message if multiple V2X applications are active without impacting an AS layer. The system 1000 includes the UE 402. The UE 402 may be substantially similar to the UE 402 of FIG. 4 and/or the remote unit 102 as described herein. Moreover, the UE 402 includes the V2X client 404 and has the V2X configuration 406 (V2X config). The V2X configuration 406 may include: for an application with a first application ID (E-UTRA PC5 radio configuration, NR PC5 radio configuration, application ID to TX profile mapping, TX profile (E-UTRA, enhanced E-UTRA, NR), V2X application priority); and for an application with a second application ID (E-UTRA PC5 radio configuration, NR PC5 radio configuration, application ID to TX profile mapping, TX profile (E-UTRA, enhanced E-UTRA, NR), V2X application priority).

The UE 402 also includes the first V2X application 408 (first V2X app) and the second V2X application 410 (second V2X app). The UE 402 has the AS layer 412 in communication with the V2X client 404. As illustrated, the system 1000 also includes the V2X control function 414.

In some embodiments, the second V2X application 410 sends 1002 a request to the V2X client 404 to transmit a message via V2X. The first V2X application 408 is already running a V2X service. In various embodiments, the V2X client 404 may check 1004 the V2X configuration 406 for the second V2X application 410 to identify the carrier frequency and TX profile required to transmit the message. The V2X client 404 may determine that the second V2X application 410 cannot be supported by the current cell. Moreover, the V2X client 404 (e.g., V2X layer) may determine that there are active V2X applications of lower priority and decide to send the V2X message to the lower layers.

In some embodiments, the AS layer 412 selects 1006 checks whether a current cell can support the requested parameters. If the AS layer 412 finds another cell that requires a different carrier frequency, the AS layer 412 may perform PLMN selection.

Figure 11:
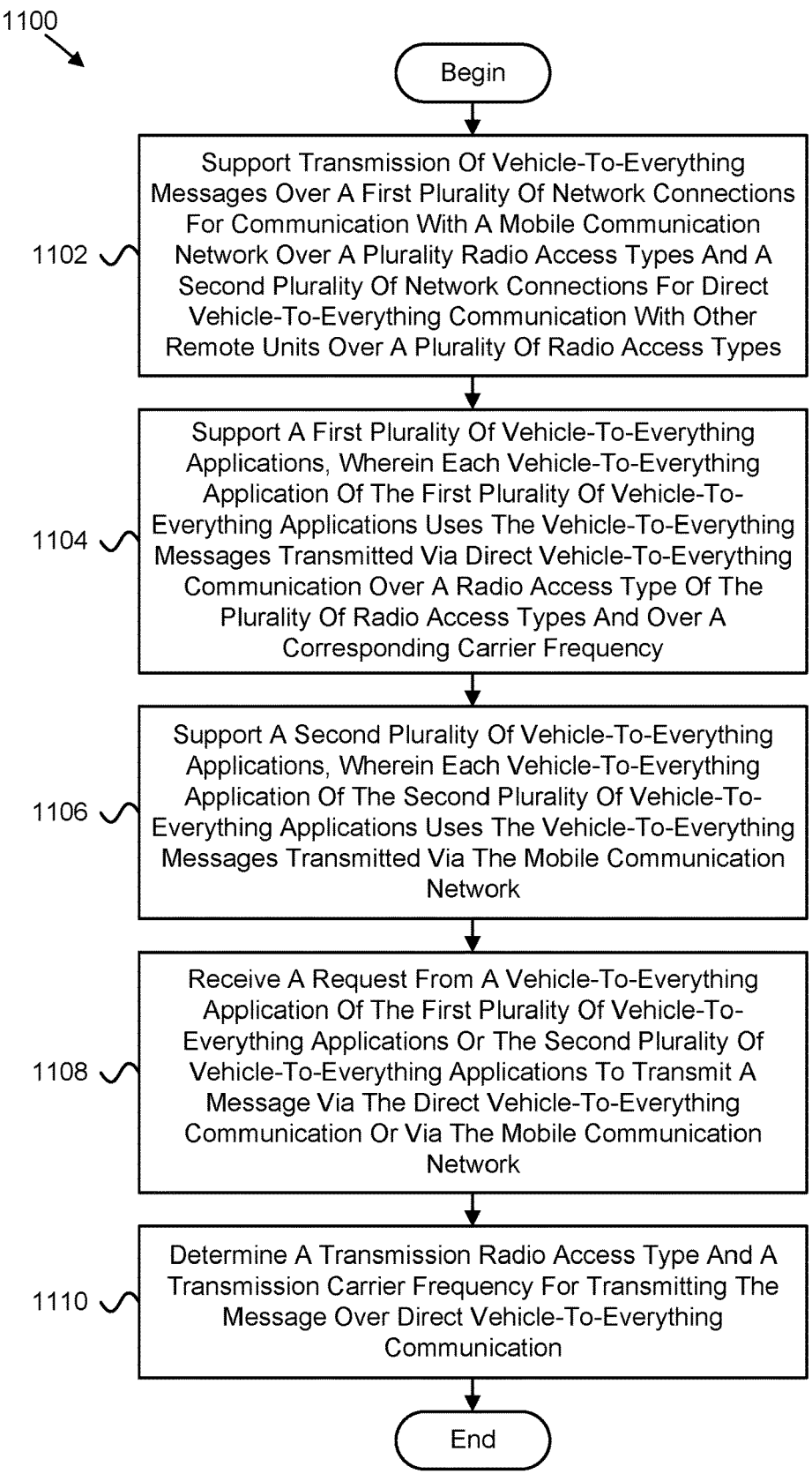
FIG. 11 is a flow chart diagram illustrating another embodiment of a method for V2X communication over multiple radio access types.

FIG. 11 is a flow chart diagram illustrating another embodiment of a method 1100 for V2X communication over multiple radio access types. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include supporting 1102 transmission of vehicle-to-everything messages over a first plurality of network connections for communication with a mobile communication network over a plurality radio access types and a second plurality of network connections for direct vehicle-to-everything communication with other remote units over a plurality of radio access types. In certain embodiments, the method 1100 includes supporting 1104 a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency. In various embodiments, the method 1100 includes supporting 1106 a second plurality of vehicle-to-everything applications, wherein each vehicle-to-everything application of the second plurality of vehicle-to-everything applications uses the vehicle-to-everything messages transmitted via the mobile communication network. In some embodiments, the method 1100 includes receiving 1108 a request from a vehicle-to-everything application of the first plurality of vehicle-to-everything applications or the second plurality of vehicle-to-everything applications to transmit a message via the direct vehicle-to-everything communication or via the mobile communication network. In certain embodiments, the method 1100 includes determining 1110 a transmission radio access type and a transmission carrier frequency for transmitting the message over direct vehicle-to-everything communication.

In certain embodiments, the method 1100 further comprises: selecting vehicle-to-everything applications of the first plurality of vehicle-to-everything applications or the second plurality of vehicle-to-everything applications that use direct vehicle-to-everything communication or the mobile communication network via a cell based on a priority and a preemption configuration; and selecting the cell that supports the selected vehicle-to-everything applications. In some embodiments, the priority corresponds to an application radio access type of the plurality of radio access types. In various embodiments, the priority corresponds to an application carrier frequency.

In one embodiment, the priority corresponds to an application radio access type of the plurality of radio access types and an application carrier frequency. In certain embodiments, the priority corresponds to an application radio access type of the plurality of radio access types and a plurality of application carrier frequencies. In some embodiments, the plurality of radio access types comprises evolved universal terrestrial radio access and new radio.

In various embodiments, determining the transmission radio access type and the transmission carrier frequency for transmitting the vehicle-to-everything message comprises identifying the transmission radio access type and the transmission carrier frequency based on a highest priority vehicle-to-everything application of the second plurality of vehicle-to-everything applications that includes a preferred radio access type of the plurality of radio access types.

In one embodiment, a method comprises: supporting transmission of vehicle-to-everything messages over a first plurality of network connections for communication with a mobile communication network over a plurality radio access types and a second plurality of network connections for direct vehicle-to-everything communication with other remote units over a plurality of radio access types; supporting a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency; supporting a second plurality of vehicle-to-everything applications, wherein each vehicle-to-everything application of the second plurality of vehicle-to-everything applications uses the vehicle-to-everything messages transmitted via the mobile communication network; receiving a request from a vehicle-to-everything application of the first plurality of vehicle-to-everything applications or the second plurality of vehicle-to-everything applications to transmit a message via the direct vehicle-to-everything communication or via the mobile communication network; and determining a transmission radio access type and a transmission carrier frequency for transmitting the message over direct vehicle-to-everything communication.

In certain embodiments, the method further comprises: selecting vehicle-to-everything applications of the first plurality of vehicle-to-everything applications or the second plurality of vehicle-to-everything applications that use direct vehicle-to-everything communication or the mobile communication network via a cell based on a priority and a preemption configuration; and selecting the cell that supports the selected vehicle-to-everything applications.

In some embodiments, the priority corresponds to an application radio access type of the plurality of radio access types.

In various embodiments, the priority corresponds to an application carrier frequency.

In one embodiment, the priority corresponds to an application radio access type of the plurality of radio access types and an application carrier frequency.

In certain embodiments, the priority corresponds to an application radio access type of the plurality of radio access types and a plurality of application carrier frequencies.

In some embodiments, the plurality of radio access types comprises evolved universal terrestrial radio access and new radio.

In various embodiments, determining the transmission radio access type and the transmission carrier frequency for transmitting the vehicle-to-everything message comprises identifying the transmission radio access type and the transmission carrier frequency based on a highest priority vehicle-to-everything application of the second plurality of vehicle-to-everything applications that includes a preferred radio access type of the plurality of radio access types.

In one embodiment, an apparatus comprises: a processor that: supports transmission of vehicle-to-everything messages over a first plurality of network connections for communication with a mobile communication network over a plurality radio access types and a second plurality of network connections for direct vehicle-to-everything communication with other remote units over a plurality of radio access types; supports a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency; and supports a second plurality of vehicle-to-everything applications, wherein each vehicle-to-everything application of the second plurality of vehicle-to-everything applications uses the vehicle-to-everything messages transmitted via the mobile communication network; and a receiver that receives a request from a vehicle-to-everything application of the first plurality of vehicle-to-everything applications or the second plurality of vehicle-to-everything applications to transmit a message via the direct vehicle-to-everything communication or via the mobile communication network; wherein the processor determines a transmission radio access type and a transmission carrier frequency for transmitting the message over direct vehicle-to-everything communication.

In certain embodiments, the processor: selects vehicle-to-everything applications of the first plurality of vehicle-to-everything applications or the second plurality of vehicle-to-everything applications that use direct vehicle-to-everything communication or the mobile communication network via a cell based on a priority and a preemption configuration; and selects the cell that supports the selected vehicle-to-everything applications.

In some embodiments, the priority corresponds to an application radio access type of the plurality of radio access types.

In various embodiments, the priority corresponds to an application carrier frequency.

In one embodiment, the priority corresponds to an application radio access type of the plurality of radio access types and an application carrier frequency.

In certain embodiments, the priority corresponds to an application radio access type of the plurality of radio access types and a plurality of application carrier frequencies.

In some embodiments, the plurality of radio access types comprises evolved universal terrestrial radio access and new radio.

In various embodiments, the processor determining the transmission radio access type and the transmission carrier frequency for transmitting the vehicle-to-everything message comprises the processor identifying the transmission radio access type and the transmission carrier frequency based on a highest priority vehicle-to-everything application of the second plurality of vehicle-to-everything applications that includes a preferred radio access type of the plurality of radio access types.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
supporting transmission of vehicle-to-everything messages over a first plurality of network connections for communication with a mobile communication network over a plurality radio access types and a second plurality of network connections for direct vehicle-to-everything communication with other remote units over a plurality of radio access types;
supporting a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency, and each vehicle-to-everything application of the first plurality of vehicle-to-everything applications runs a respective vehicle-to-everything service;
supporting a second plurality of vehicle-to-everything applications, wherein each vehicle-to-everything application of the second plurality of vehicle-to-everything applications uses the vehicle-to-everything messages transmitted via the mobile communication network, and each vehicle-to-everything application of the second plurality of vehicle-to-everything applications runs a respective vehicle-to-everything service;
receiving a request from a specific vehicle-to-everything application of the first plurality of vehicle-to-everything applications or the second plurality of vehicle-to-everything applications to transmit a message via the direct vehicle-to-everything communication or via the mobile communication network; and
determining a transmission radio access type and a transmission carrier frequency for transmitting the message over direct vehicle-to-everything communication based at least partly on a priority of the specific vehicle-to-everything application and a preemption configuration corresponding to the specific vehicle-to-everything application, wherein the transmission carrier frequency is mapped to the vehicle-to-everything application.

2. The method of claim 1, further comprising:
selecting vehicle-to-everything applications of the first plurality of vehicle-to-everything applications or the second plurality of vehicle-to-everything applications that use direct vehicle-to-everything communication or the mobile communication network via a cell based on a priority and a preemption configuration; and
selecting the cell that supports the selected vehicle-to-everything applications.

3. The method of claim 2, wherein the priority corresponds to an application radio access type of the plurality of radio access types.

4. The method of claim 2, wherein the priority corresponds to an application carrier frequency.

5. The method of claim 2, wherein the priority corresponds to an application radio access type of the plurality of radio access types and an application carrier frequency.

6. The method of claim 2, wherein the priority corresponds to an application radio access type of the plurality of radio access types and a plurality of application carrier frequencies.

7. The method of claim 1, wherein the plurality of radio access types comprises evolved universal terrestrial radio access and new radio.

8. The method of claim 1, wherein determining the transmission radio access type and the transmission carrier frequency for transmitting the vehicle-to-everything message comprises identifying the transmission radio access type and the transmission carrier frequency based on a highest priority vehicle-to-everything application of the second plurality of vehicle-to-everything applications that includes a preferred radio access type of the plurality of radio access types.

9. An apparatus comprising:
a processor that:
supports transmission of vehicle-to-everything messages over a first plurality of network connections for communication with a mobile communication network over a plurality radio access types and a second plurality of network connections for direct vehicle-to-everything communication with other remote units over a plurality of radio access types;
supports a first plurality of vehicle-to-everything applications, wherein each vehicle-to-everything application of the first plurality of vehicle-to-everything applications uses the vehicle-to-everything messages transmitted via direct vehicle-to-everything communication over a radio access type of the plurality of radio access types and over a corresponding carrier frequency, and each vehicle-to-everything application of the first plurality of vehicle-to-everything applications runs a respective vehicle-to-everything service; and
supports a second plurality of vehicle-to-everything applications, wherein each vehicle-to-everything application of the second plurality of vehicle-to-everything applications uses the vehicle-to-everything messages transmitted via the mobile communication network, and each vehicle-to-everything application of the second plurality of vehicle-to-everything applications runs a respective vehicle-to-everything service; and a receiver that receives a request from a specific vehicle-to-everything application of the first plurality of vehicle-to-everything applications or the second plurality of vehicle-to-everything applications to transmit a message via the direct vehicle-to-everything communication or via the mobile communication network;

wherein the processor determines a transmission radio access type and a transmission carrier frequency for transmitting the message over direct vehicle-to-everything communication based at least partly on a priority of the specific vehicle-to-everything application and a preemption configuration corresponding to the specific vehicle-to-everything application, and the transmission carrier frequency is mapped to the vehicle-to-everything application.

10. The apparatus of claim 9, wherein the processor:
selects vehicle-to-everything applications of the first plurality of vehicle-to-everything applications or the second plurality of vehicle-to-everything applications that use direct vehicle-to-everything communication or the mobile communication network via a cell based on a priority and a preemption configuration; and
selects the cell that supports the selected vehicle-to-everything applications.

11. The apparatus of claim 10, wherein the priority corresponds to an application radio access type of the plurality of radio access types.

12. The apparatus of claim 10, wherein the priority corresponds to an application carrier frequency.

13. The apparatus of claim 10, wherein the priority corresponds to an application radio access type of the plurality of radio access types and an application carrier frequency.

14. The apparatus of claim 10, wherein the priority corresponds to an application radio access type of the plurality of radio access types and a plurality of application carrier frequencies.

15. The apparatus of claim 9, wherein the plurality of radio access types comprises evolved universal terrestrial radio access and new radio.

16. The apparatus of claim 9, wherein the processor determining the transmission radio access type and the transmission carrier frequency for transmitting the vehicle-to-everything message comprises the processor identifying the transmission radio access type and the transmission carrier frequency based on a highest priority vehicle-to-everything application of the second plurality of vehicle-to-everything applications that includes a preferred radio access type of the plurality of radio access types.

\* \* \* \* \*